United States Patent
Kocher et al.

[15] 3,678,410
[45] July 18, 1972

[54] TRANSVERSE FLOW LASER CELL

[72] Inventors: Robert C. Kocher, Great Neck; Franklin K. Moore, Ithaca; Harold Samelson, Sea Cliff; William R. Watson, College Point, all of N.Y.

[73] Assignee: GTE Laboratories Incorporated

[22] Filed: Nov. 24, 1970

[21] Appl. No.: 92,354

[52] U.S. Cl. ............................................331/94.5, 330/4.3
[51] Int. Cl. ...........................................................H01s 3/02
[58] Field of Search..................................331/94.5; 330/4.3

[56] References Cited

UNITED STATES PATENTS 3,302,127   1/1967   Shao-chi Lin..........................331/94.5
3,571,747   3/1971   Bronfin et al..........................331/94.5

*Primary Examiner*—William L. Sikes
*Attorney*—Irving M. Kriegsman

[57] ABSTRACT

A laser cell for a transverse flow liquid laser has an active region in the form of a rectangular prism and cylindrical input and output chambers mounted in spaced-apart relationship in the transverse direction at opposite ends of the active region. A baffle positioned in the input chamber causes the liquid to flow uniformly through the active region.

7 Claims, 3 Drawing Figures

PATENTED JUL 18 1972 3,678,410

INVENTORS.
ROBERT KOCHER
FRANKLIN MOORE,
HAROLD SAMELSON
WILLIAM R. WATSON 3,678,410

TRANSVERSE FLOW LASER CELL

BACKGROUND OF THE INVENTION

This invention relates to lasers and, in particular, to cells for lasers which utilize a flowing liquid as the active material.

Solids, gases and liquids have been used as active materials in lasers. Lasing is initiated by raising the energy levels of the atoms in the active material from the levels which they normally occupy to a higher energy level or excited state. This process of excitation is generally accomplished in a liquid laser by a high intensity light source. As hereinafter used, the term "active material" shall refer only to a liquid active material.

When the atoms of an active material are in an excited state, they can be stimulated to emit a photon by interaction with an incident photon. As a result, the incoming photon, or wave, is augmented by the one given up by the excited atom. The released wave falls in phase with the wave that triggered its release. Hence, an amplifying action ensues.

The active material is excited while in a laser cell. In order to sustain laser operation, the laser cell must be part of a resonant cavity having at least two separated reflecting surfaces, one of which is partially transmissive. The wave caused by the release of the photon from the atom in the excited material must travel a path which is substantially parallel to the longitudinal axis of the resonant cavity so that it may be repeatedly reflected through the active material. As the wave travels through the material, it stimulates more atoms to release photons which further amplifies and reinforces the wave. Each time the wave is reflected at the partially transmissive reflecting surface a small portion of it passes through the surface. This small portion constitutes the laser output beam.

Two desirable properties of the laser output beam are coherence and collimation. Optical distortion of the laser output beam shall herein be taken to mean an impairment of either of these properties. The optical characteristic of liquid active material which primarily determines the quality of the output laser beam is the uniformity of the refractive index of the liquid which, in turn, is dependent upon the uniformity of the liquid's temperature and density. When a laser is excited, large amounts of heat may be absorbed unevenly by the liquid tending to cause it to have warmer and cooler layers which results in a non-uniform refractive index. Excitation of the laser while these non-uniform conditions exist may cause optical distortion of the laser output beam.

Optical distortion of the output beam may be prevented by insuring that isothermal conditions exist in the cell prior to excitation. The flowing liquid laser, wherein the liquid active material continuously flows through the laser cell, was developed to provide a liquid laser capable of frequent, successive excitations. Isothermal conditions are established in the cell of the flowing liquid laser by causing the mixing of adjacent liquid layers thereby reducing temperature inhomogeneities and index of refraction gradients in the liquid prior to excitation and replacing the excited liquid by unexcited liquid between successive excitations. The time between successive excitations, i.e. the pulse repetition rate, therefore is dependent upon the linear rate at which the liquid material flows through the active region. Prior cells for liquid lasers required relatively high linear liquid flow rates to obtain high pulse repetition rates. The cell of this invention achieves high pulse repetition rates at relatively low linear liquid flow rates.

SUMMARY OF THE INVENTION

The present invention relates to a cell for a laser and, in particular, to a cell for a flowing liquid laser wherein the liquid flows through the cell in a direction transverse to the laser output beam.

Excitation of the flowing liquid laser takes place along the longitudinal axis of the cell at a place where the liquid flow is uniform and isothermal. Since the liquid flows in the transverse direction, each excitation produces an excited volume of the laser material extending along the entire longitudinal axis of the cell and extending a relatively small distance on either side of that axis in the transverse direction. This excited volume of liquid has temperature and index of refraction gradients; therefore it is desirable to replace this entire volume of excited liquid with unexcited isothermal active material prior to the next laser excitation. Since the liquid flows transverse to the excitation and only a relatively small transverse portion of the liquid is excited, the entire volume of excited liquid must flow only a relatively small transverse distance before a new isothermal volume of liquid becomes available for excitation. In this manner, a relatively high pulse repetition rate is achieved with a relatively low linear flow rate.

While relatively high pulse repetition rates are achievable with a transverse cell, it is difficult to achieve uniform flow conditions in the excitation region of the cell. In a transverse cell, liquid active material flows into the cell from a cylindrical pipe coupled to the cell. Generally, the volume of the cell is relatively larger than that of the pipe with the cell extending in a direction perpendicular to the liquid flow. The liquid active material therefore tends to flow through the center of the cell with only a relatively small portion of the liquid flowing proximate to the cell walls. The unequal flow distribution results in the establishment of a velocity gradient within the cell with the liquid at the center of the cell flowing relatively faster than the liquid near the cell walls. Due to the velocity gradient, excitation of the cell gives rise to temperature and index of refraction gradients within the liquid active material which causes distortion of the laser output beam. The cell of this invention produces uniform flow of liquid in the excitation region by providing a transition area between the entrance to the cell and the excitation region wherein the liquid flow is smoothed.

The cell comprises an active region having a longitudinal and a transverse axis and an input and an output chamber coupled to the active region in spaced apart relationship along the transverse axis. Baffle means is positioned in the input chamber. Liquid active material flowing into the input chamber of the cell is incident on the baffle means which promotes the mixing of the active material as it flows through the input chamber of the cell and produces uniform liquid flow in the active region of the cell.

In one embodiment of the invention the baffle means comprises a plate having a plurality of holes which is positioned in the input chamber and extends in the longitudinal direction for the entire length of the input chamber thereby dividing the input chamber into two sections. Liquid active material flows into the first section wherein it is incident on the plate which nearly stops the flow of liquid and causes the liquid to be retained in the first section long enough for the liquid to become uniformly distributed with nearly zero velocity and uniform pressure adjacent the entire upstream surface of the plate. In addition, liquid active material in the first section upstream from the plate is thoroughly mixed thereby eliminating inhomogeneities which may exist in the liquid active material flowing into the input chamber.

The liquid active material which is distributed over the upstream surface of the plate is then forced to flow through the holes in the plate thereby producing a plurality of uniformly distributed identical small liquid jets adjacent the downstream surface of the plate. These liquid jets interact to produce mixing of the liquid active material. Since the average flow rate of the downstream side of the plate equals the average flow rate at the upstream side, i.e. approximately zero, mixing of the liquid jets occurs at a relatively low transverse flow speed. Thus, a uniform slowly flowing liquid mass is produced adjacent the downstream side of the plate. The uniform liquid flows into the active region wherein it is excited to produce a laser output having relatively low distortion.

Further features and advantages of the invention will become more readily apparent from the following detailed description of a specific embodiment of the invention when taken in conjunction with the accompanying drawings.

DESCRIPTION OF THE PREFERRED EMBODIMENT

Figure 1:
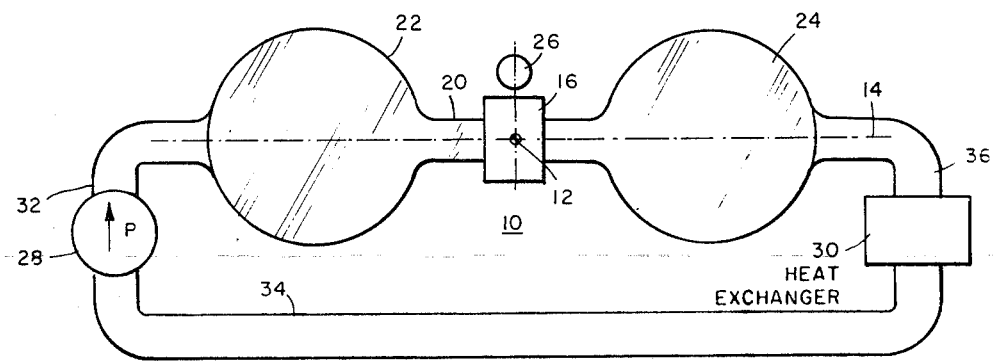
FIG. 1 is a representation of a flowing liquid laser.

Referring now to FIG. 1, there is shown a schematic representation of the circulating liquid laser. A circulating liquid laser is one in which the liquid active material continuously flows through a closed system. Although many liquid active media for lasers are known and can be used, in the preferred form of this invention the liquid active medium is a solution of a dye, a solvent and a triple state quencher. Preferably, the dye is Rhodamine 6G, the solvent is ethanol, and the triple state quencher is cyclooctatetraene, hereinafter referred to as COT. This solution may be prepared by stirring a measured amount of Rhodamine 6G in ethanol until the dye is fully dissolved. COT is then added to the dye solution.

Referring now to FIG. 1, the circulating liquid laser comprises a cell 10 having a longitudinal axis 12 perpendicular to the plane of FIG. 1 and a transverse axis 14. Mirror 16 is mounted externally to the cell. Alternatively, mirror 16 may be a reflective coat placed directly on the cell wall. A second mirror (not shown) is positioned in optical alignment with mirror 16 at the other side of the cell. One of the mirrors, for example mirror 16, a totally reflecting, i.e. it reflects substantially all the light impinging upon it. The other mirror is only partially reflective in that it reflects only portion of the light impinging upon it while permitting the remainder of the light to be transmitted therethrough as the output beam of the laser.

The cell further comprises an active region 20 in the form of a rectangular prism, an input chamber 22 and an output chamber 24 positioned at opposite ends of active region 20. The input and output chambers are in the form of hollow elongated cylinders extending in the longitudinal direction.

Excitation means in the form of light source 26 is positioned in close proximity to active region 20 and extends along longitudinal axis 12. The light source, which may be a high pressure Xenon filled lamp controlled by an external circuit (not shown) provides a source of excitation energy to the active material flowing through the cell. The walls of active region 20 are constructed of quartz or other material which transmits radiation with negligible attenuation at the frequency required to excite the active material.

The laser further comprises a pump 28 for circulating the liquid active material and a heat exchanger 30 for cooling the liquid after it flows out of the cell. Lines 32, 34 and 36 interconnect pump 28, heat exchanger 30, and cell 10.

In operation, pump 28 circulates the liquid active material through the input chamber 22, active region 20 and output chamber 24 of cell 10. The laser output beam is obtained by actuating light source 26. Part of the energy produced by the light source is absorbed in the liquid active material in the active region thereby producing a volume of excited liquid in the form of a rectangular prism proximate to the light source and extending in the longitudinal direction over the entire width of the active region and for a relatively small distance in the transverse direction. The excited volume of liquid contains photons which are repeatedly reflected through the active medium by the mirrors thereby producing the laser output beam. Maximum power output and minimum distortion of the laser output beam are obtained when the liquid active material is uniform in the transverse and longitudinal directions just prior to excitation and the rectangular prism of liquid occupies the entire active region with the sides of the prism parallel to the corresponding walls of the active region. Cell 10 is designed to provide these conditions.

Figure 2:
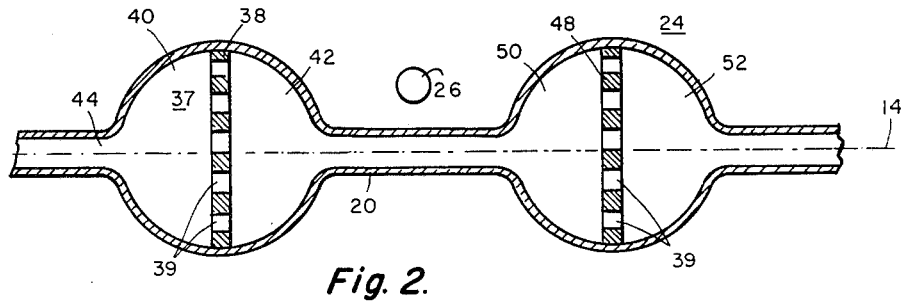
FIG. 2 is a cross-sectional view of the cell of this invention.
Figure 3:
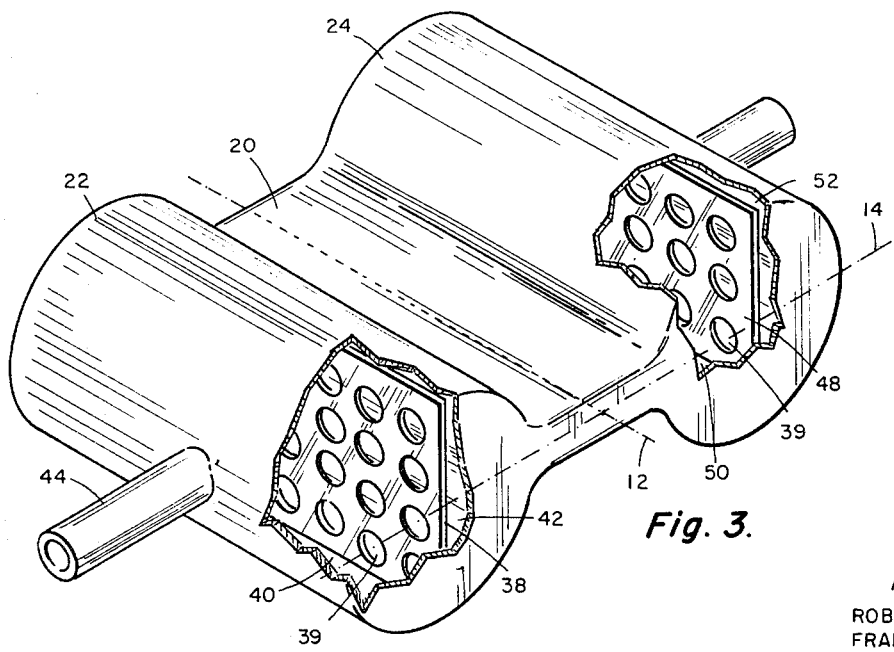
FIG. 3 is an isometric representation of the cell of this invention.

Referring to FIGS. 2 and 3, input chamber 22 has positioned therein a baffle comprising a plate 38 having a plurality of holes 39. The plate extends in the longitudinal direction for the entire length of the input chamber thereby dividing the input chamber into a first section 40 and a second section 42. Liquid active material flows into first section 40 of the input chamber through input port 44. Since the liquid volume cannot expand, the liquid tends to flow directly into the first section and is incident on plate 38 in an area opposite input port 44. The plate nearly stops the liquid flow causing the liquid to be retained in first section 40 upstream of the plate long enough to ensure that mixing eliminates inhomogeneities which may be present in the liquid prior to entry into the cell and producing a uniform condition of the liquid throughout the volume of first section 40. Thus, the liquid active material becomes uniformly distributed over the upstream surface of plate 38 with an average flow rate approximately equal to zero adjacent the plate.

The liquid active material is then forced by the action of the pump 28 through the holes in the plate 38 into second section 42 of input chamber 22 and emerges on the downstream side of the plate as a plurality of identical liquid jets. These high speed jets of liquid emerging from the plate interact to ensure thorough mixing of the liquid. Since the total volume rates of liquid flow adjacent the upstream and downstream sides of plate 38 must be equal, and the total flow area is unchanged in crossing the plate, mixing of the liquid jets occurs at the same very low average transverse flow rate as exists in the first section 40. Therefore, mixing of the liquid occurs adjacent to plate 38 and a uniform liquid is produced in second section 42 relatively close to the plate. As the liquid continues to flow downstream towards the active region, the liquid flow rate increases as the volume of section 42 decreases and a uniform flow of liquid is provided in the active region. Although only one plate is shown in input chamber 22 the input chamber may contain a plurality of similar plates to control the liquid flow.

After the liquid flows out of active region 20 it enters output chamber 24. The output chamber may comprise a second plate 48 similar to plate 38 extending along the longitudinal direction over the entire length of output chamber 24 and dividing the output chamber into a first section 50 and a second section 52. The output chamber prevents stagnation of the liquid active material in the active region of the cell and assures a smooth uniformly accelerated liquid flow out of the active region.

Light source 26 can be positioned along longitudinal axis 14 at the point where the most uniform liquid flow conditions exist. This point can be ascertained by establishing steady flow conditions in the laser system and then probing the active region of the cell along the longitudinal axis with a second laser beam. The point where the second laser beam experiences minimum distortion is where uniform flow conditions exist. Light source 26 may thereafter be positioned at this point.

Cell 10 is particularly advantageous when a high pulse repetition rate or continuous wave (cw) operation is desired. In a liquid laser medium after excitation, the volume of excited liquid will contain temperature gradients giving rise to density and index of refraction gradients. To obtain minimum distortion of the laser output beam, this volume of excited liquid should be replaced by unexcited liquid prior to the next succeeding laser excitation. Since in this transverse flow cell only a relatively small amount of liquid is excited in the transverse direction, the volume of excited liquid need be displaced only a relatively short transverse distance before being replaced by an unexcited volume of liquid. The entire volume of excited liquid can therefore be quickly replaced with unexcited liquid and reexcitation of the laser can occur rapidly.

In a typical cell the inside diameter of the input and output chambers are about 1 5/8 inches and the chambers extend about 2 1/2 inches in the longitudinal direction. Plates 38 and 48 contain 35 holes symmetrically placed and the plates are 5/64 inches thick. The active region extends 2 3/8 inches in the transverse direction, 4 inches in the longitudinal direction, and is 3/16 inches wide.

What is claimed is:

1. A cell for a laser utilizing a flowing liquid as active material, comprising:
   a. an active region having a longitudinal axis and a transverse axis;
   b. an input chamber coupled to said active region having a port therein for receiving the flow of active material, said active material flowing into said input chamber parallel to said transverse axis; and
   c. baffle means positioned in said input chamber cooperatively with the incoming flow of active material, said baffle means promoting the mixing of said active material in said input chamber, which causes a uniform flow of liquid active material in said active region.

2. The cell of claim 1, wherein said baffle means comprises a plate having a plurality of holes therein, said plate extending in the longitudinal direction for the entire length of said chamber and dividing said input chamber into first and second sections, said liquid active material flowing into said cell being incident on said plate causing said liquid active material to slow down and be retained in said first section, said liquid active material becoming uniformly distributed over the surface of said plate, said liquid flowing through the holes in said plate and emerging into the second section as a plurality of liquid jets, said liquid jets interacting to produce mixing of the liquid causing uniform liquid flow in the second section of said input chamber.

3. The cell of claim 2, wherein said input chamber is in the form of a hollow cylindrical body having a longitudinal axis parallel to the longitudinal axis of said active region.

4. The cell of claim 3, wherein said active region is in the form of a rectangular prism.

5. The cell of claim 4 further comprising an output chamber coupled to said active region in spaced apart relationship along said transverse axis from said input chamber for receiving the liquid which flows out of said active region.

6. The cell of claim 5, wherein said output chamber comprises a plate having a plurality of holes therein, said plate extending in the longitudinal direction for the entire length of said output chamber thereby dividing said output chamber into two sections.

7. The cell of claim 6, wherein said output chamber is in the form of a hollow cylindrical body having a longitudinal axis parallel to the longitudinal axis of said active region.

* * * * *